UNITED STATES PATENT OFFICE.

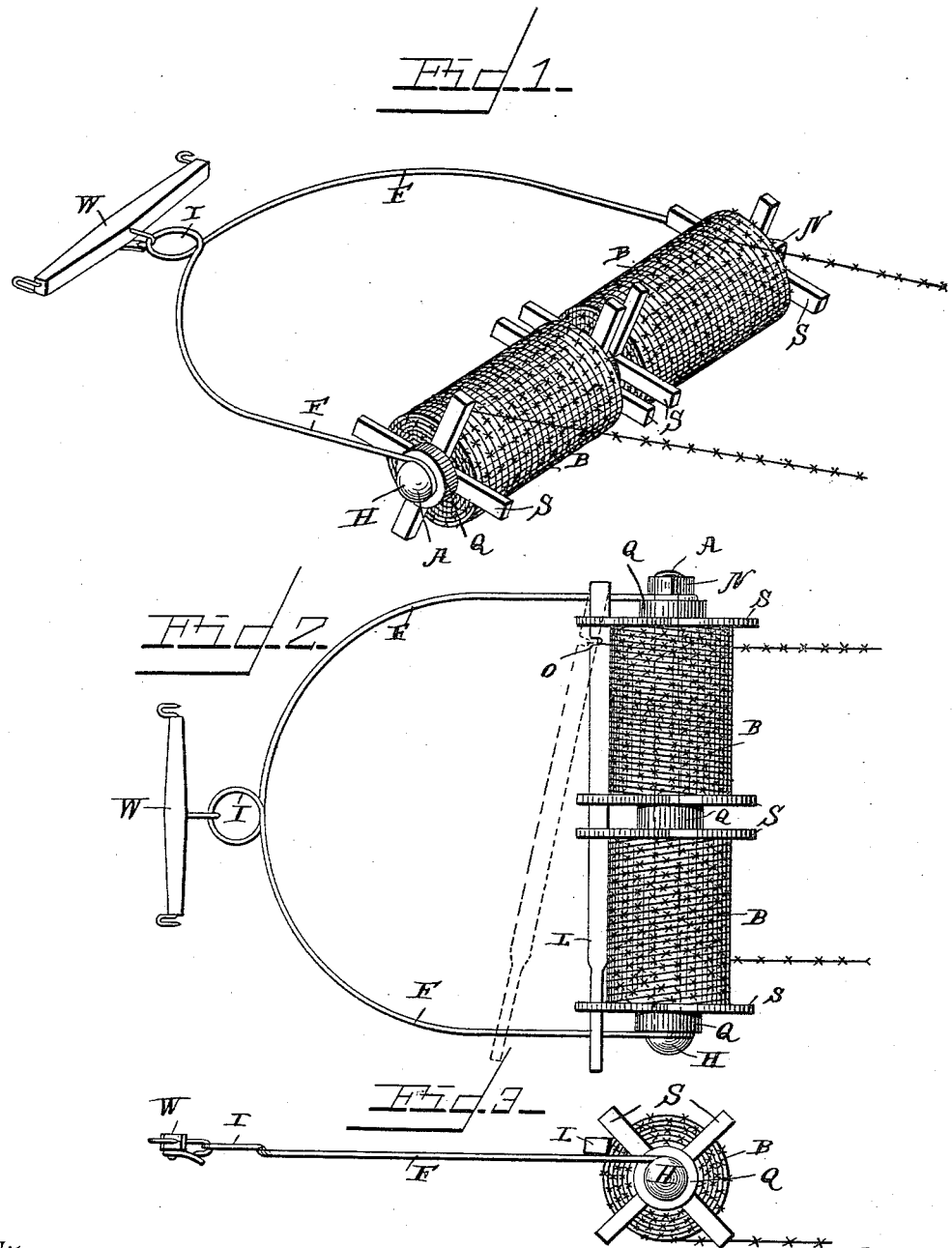

EDWARD WOODWARD, OF KEITH, TEXAS.

WIRE-STRETCHER.

SPECIFICATION forming part of Letters Patent No. 457,469, dated August 11, 1891.

Application filed January 28, 1891. Serial No. 379,440. (No model.)

*To all whom it may concern:*

Be it known that I, EDWARD WOODWARD, a citizen of the United States, residing at Keith, in the county of Grimes and State of Texas, have invented a new and useful Wire-Stretcher, of which the following is a specification.

This invention relates to machines for paying out and tightening wire; and the object of the same is to effect certain improvements in machines of this character adapted for use in fence-building.

To this end the invention consists of a machine embodying the details of construction hereinafter more fully described and claimed, and as illustrated on the accompanying sheet of drawings, wherein—

Figure 1 is a perspective view of this machine in the operation of paying out wire and at the same time stretching or tightening the same. Fig. 2 is a plan view showing the manner in which the rotation of the spools is prevented when desired, and showing in dotted lines how a final additional tension may be given to the wires. Fig. 3 is an end view of the device, showing it arranged to simply pay out wire.

Referring to the said drawings, the letter W designates a whiffletree which is connected to an eye I at the front end of a frame F, and through other eyes at the rear end of said frame is passed an axle A, having a head H on one end and a nut N removably screwed upon the other end, whereby the axle is retained within the frame. Upon this axle is located a number of spools S, preferably separated by washers Q, and these spools are wound with plain or barbed wires B, as shown.

In operation one end of each wire is secured to a fence-post and a horse or team of horses hitched to the whiffletree W and driven along close to the line of posts. If the spools be arranged as shown in Fig. 3—that is to say, so that the wire leads from their under sides—it will be obvious that the wire will be simply paid out as the spools revolve in contact with the ground; but if the wires lead from the upper sides of the spools, as shown in Fig. 1, the result will be slightly different. In this case the forward movement of the device over the ground and the contact of the flanges of the spools with the ground will tend to give said spools a forward rotation, whereas the wire as it unwinds from the bodies of the spools will give them a backward rotation, and the result will be that the wire will be strained or tightened by just as much friction or resistance as results from the contact of the spool ends with the ground. In this manner the wire can be paid out and stretched simultaneously.

After the wires have been stretched, if it be desired to give them a final additional tension the device illustrated in Fig. 2 is brought into use. This consists of a lever L, preferably having a notch O in one side at about the point shown, and its use is as follows: The forward movement of the entire device is stopped and the spools turned so that there shall be a little slack of the wire B within the frame F. The lever L is inserted in front of the spools through this slack and with its ends upon the frame. I should have mentioned that the ends of the spools are cut away, as shown, and when the lever is inserted as thus described it passes into certain of these cut-away portions, and, as is shown in Fig. 2, the horses being started on, the wires are again tightly stretched, the one in question passing from its spool through the notch O of the lever and thence under the spool, and the other wire or wires leading to the rear directly from their spools. After a good tension has been given to the wires the horses are stopped and the longer end of the lever can be grasped by the operator and moved forwardly, and this motion will impart a final additional tension to the wire which passes through the notch O. The wire is then stapled to the posts and the other wires tightened and stapled in the same manner.

It will be obvious that a long frame F may be used and a number of spools mounted upon the axle, or a single spool may be used within the frame. By turning home the nut N a considerable friction is imparted to the ends of the spools, which is sometimes desirable to increase the tension of the wire.

What is claimed as new is—

The herein-described fence-wire reel, the same comprising a frame, an axle carried thereby, spools journaled upon said axle, said spools having enlarged ends provided with cut-away portions, and a tightening-lever normally resting upon said frame and entering said cut-away portions, the lever having a notch opposite the body of one spool, all as and for the purpose hereinbefore set forth.

In testimony that I claim the foregoing as my own I have hereto affixed my signature in presence of two witnesses.

EDWARD WOODWARD.

Witnesses:
R. B. TEMPLEMAN,
W. N. NORWOOD.